(12) United States Patent
Havran et al.

(10) Patent No.: US 8,573,124 B2
(45) Date of Patent: Nov. 5, 2013

(54) ELECTRONIC SAFE/ARM SYSTEM AND METHODS OF USE THEREOF

(75) Inventors: Curtis Havran, Gilbert, AZ (US);
Jackie Wayne Spears, Chandler, AZ (US); Karina Ogilvie, Chandler, AZ (US); Robert John Keller, Phoenix, AZ (US); David Phillips, Scottsdale, AZ (US)

(73) Assignee: Orbital Sciences Corporation, Dulles, VA (US)

( * ) Notice: Subject to any disclaimer, the term of this patent is extended or adjusted under 35 U.S.C. 154(b) by 360 days.

(21) Appl. No.: 12/778,046

(22) Filed: May 11, 2010

(65) Prior Publication Data

US 2011/0277620 A1   Nov. 17, 2011

(51) Int. Cl.
*C06C 5/06* (2006.01)

(52) U.S. Cl.
USPC ..... 102/206; 102/202.9; 102/215; 102/275.6; 102/202.14; 102/322; 102/275.5; 89/1.14

(58) Field of Classification Search
USPC ........... 102/200, 202.5, 202.7, 202.9, 202.12, 102/202.14, 206, 217, 275.6, 275.12, 102/275.11, 322, 215; 89/1.14
See application file for complete search history.

(56) References Cited

U.S. PATENT DOCUMENTS

| | | | |
|---|---|---|---|
| 4,819,560 A | 4/1989 | Patz et al. | |
| 5,159,146 A | 10/1992 | Carisella et al. | |
| 6,622,627 B2 * | 9/2003 | Sansolo | 102/202.12 |
| 2003/0075069 A1 | 4/2003 | Boucher et al. | |
| 2011/0219977 A1 * | 9/2011 | Lucas et al. | 102/202.7 |

FOREIGN PATENT DOCUMENTS

FR         2 702 824         9/1994

* cited by examiner

*Primary Examiner* — James Bergin
(74) *Attorney, Agent, or Firm* — Ropes & Gray LLP

(57) ABSTRACT

An ordnance firing system is disclosed that includes a reusable electronics module and an ordnance module, each enclosed in a separate, sealed housing. The electronics module housing encloses firing electronics for electrically triggering initiation of a detonator in the ordnance module. The electronics module detachably connects to the ordnance modules via a connector which extends away from the electronics module housing. The housing of the ordnance module is constructed to be blast-resistant to prevent detonation of the detonator from rendering the electronics module inoperable.

15 Claims, 7 Drawing Sheets

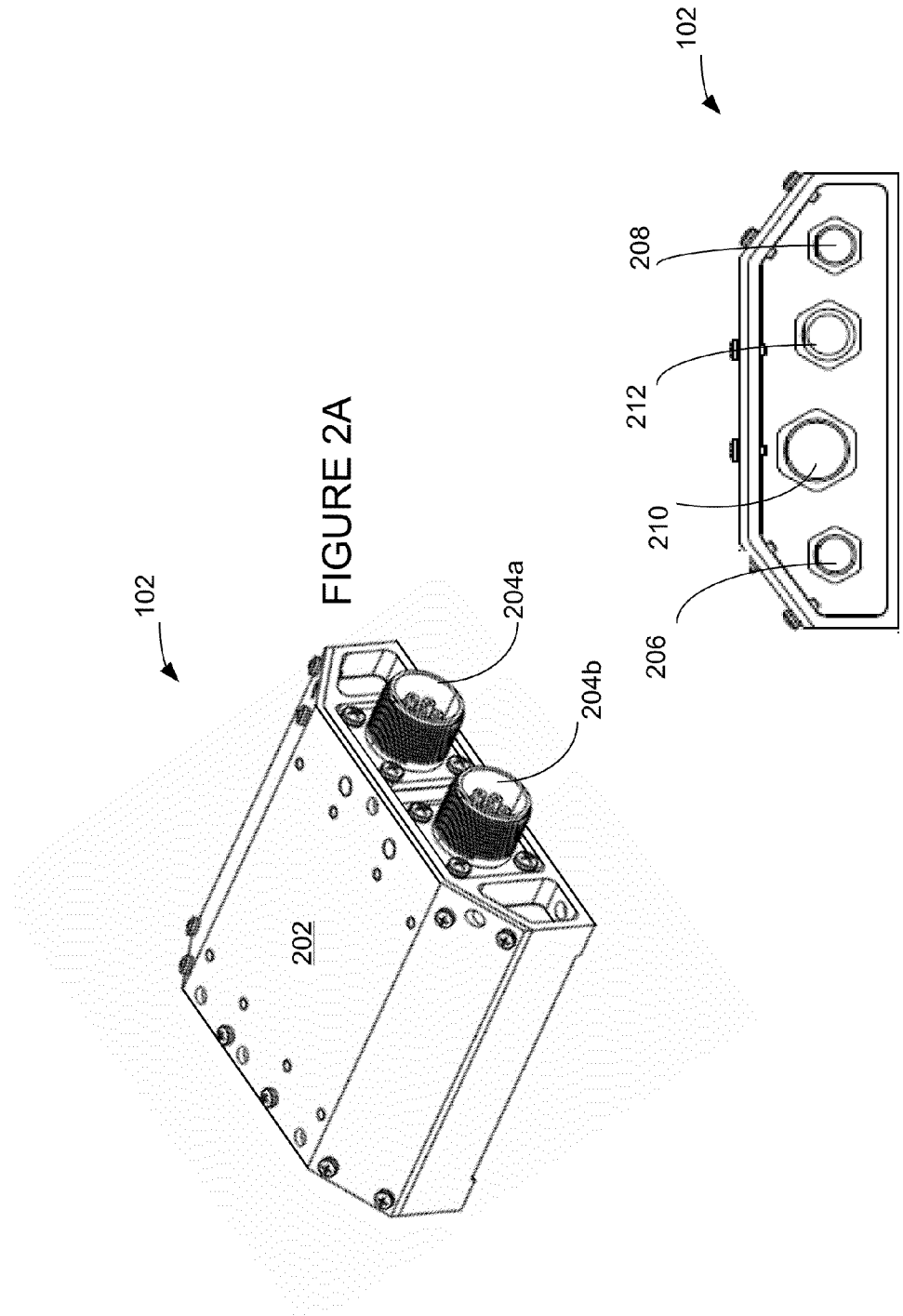

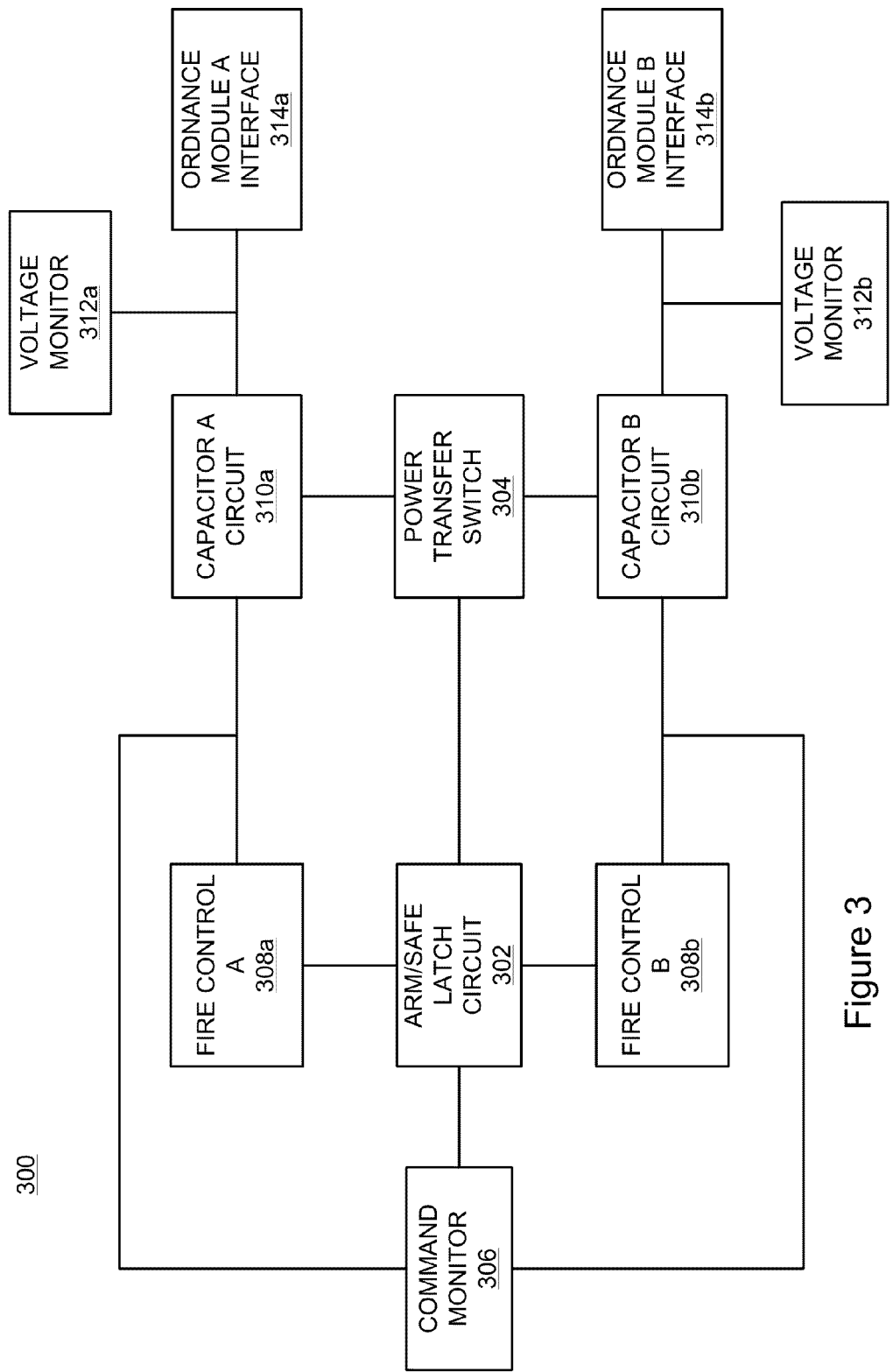

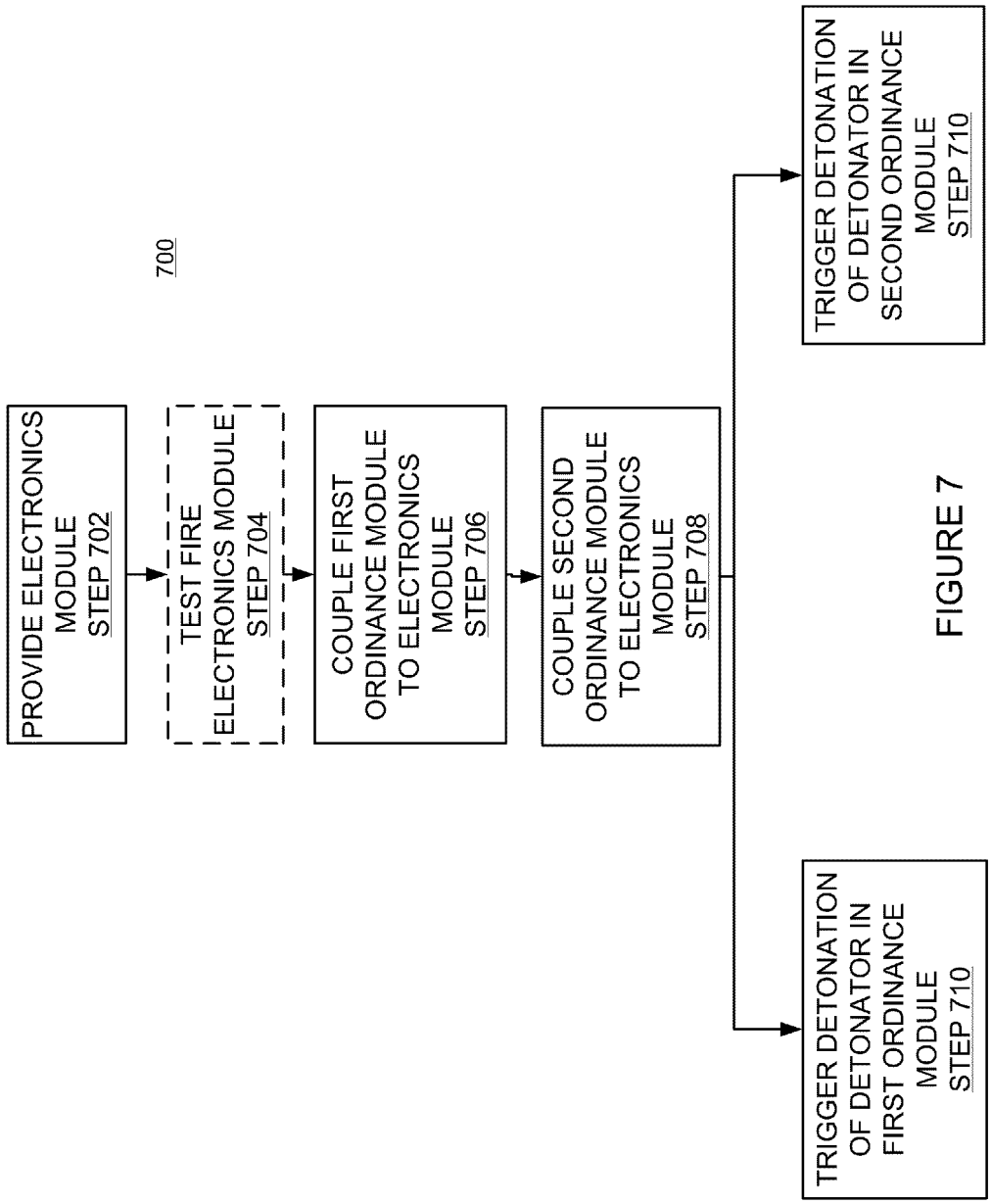

ELECTRONIC SAFE/ARM SYSTEM AND METHODS OF USE THEREOF

BACKGROUND OF THE INVENTION

Various electronic safe/arm devices (ESAD's) are known. A typical ESAD includes two portions, an electronics portion and an explosive ordnance portion that houses the detonator assembly. In most ESADs, the two portions are enclosed in a single housing. As a result, use of such an ESAD will invariably destroys the entire device. Single housing ESADs also suffer from an inability to be safely and easily transported, disposed of if unused, or have their electronics tested, as the power electronics are intrinsically connected to the detonators, increasing the risk of inadvertent initiations.

To mitigate certain of the shortcomings of traditional ESADs, more recent ESADs have been developed that maintain the electronics portion of the ESAD in a separate housing to which an ordnance module can later be attached. This advance allows for the easy transport and safe testing of ESAD electronics, but it failed to enable repeated uses of the electronics, as they still are usually damaged or destroyed upon a single use.

BRIEF SUMMARY OF THE INVENTION

To overcome this shortcoming and others, according to one aspect the invention relates to a firing system that includes a reusable electronics module. The firing system includes an electronics module and an ordnance module. The electronics module includes a first housing that encloses firing electronics for electrically triggering initiation of a detonator. The electronics module also includes a connector that extends away from the first housing for detachably mechanically and electrically connecting the electronics module to the ordnance module.

The ordnance module includes a second, blast-resistant housing that encloses a detonator. The detonator, in one embodiment, is an explosive foil initiator, also known as a slapper detonator. The ordnance module housing is sufficiently blast-resistant that detonation of the detonator does not render the electronics module connected thereto inoperable or unable to connect to a second ordnance module. The ordnance module also includes a connector that extends away from the proximal end of the ordnance module housing. The ordnance module connector is configured to mate with the electronics module connector.

The connectors extending from the electronics module and ordnance module housings, in one embodiment, are complementary multi-pin connectors compliant with US military standards MS3106-16 or SAE-AS31061. A plurality of pins of the multi-pin connectors are used for carrying, in parallel, current to the ordnance module, and a plurality of the pins are used for carrying, in parallel, current back from the ordnance module, to provide a low impedance connection. In one embodiment, the connectors are threaded. The ordnance module includes, in one embodiment, a threaded, rotatable hex coupling nut for easy attachment and securing of the ordnance module connector to the electronics module connector.

In one embodiment, the electronics module includes a second electronics module connector for mating to a second ordnance module, such that the electronics module can be coupled to two ordnance modules concurrently. In such embodiments, the electronics module can be configured to trigger both ordnance modules simultaneously, or one after the other.

According to another aspect, the invention relates to a method of using a firing system. The method includes providing an electronics module that encloses firing electronics within a first housing. An ordnance module is then coupled to the electronics module via a connector extending away from the electronics module housing. The ordnance module includes a blast-resistant housing that encloses a detonator. The detonator, in one embodiment, is an explosive foil initiator, also known as a slapper detonator. The ordnance module housing is sufficiently blast-resistant that detonation of the detonator does not render the electronics module connected thereto inoperable or unable to connect to a second ordnance module. The method further includes triggering initiation of the detonator without the resulting detonation substantially damaging the electronics module.

In certain embodiments, the method includes coupling a second ordnance module to the electronics module. In one embodiment, the second ordnance module is coupled to the electronics module prior to initiation of the first ordnance module. The ordnance modules may then be initiated in substantially simultaneously or at separate times. In other embodiments, the second ordnance module is connected to the electronics module subsequent to the initiation of the detonator in the first ordnance module. The second ordnance module may be coupled to the same electronics module connector used to connect the first ordnance module to the electronics module, or it may be coupled to a different electronics module connector. The electronics module then triggers initiation of the detonator in the second ordnance module.

In one embodiment, the method includes test firing the firing electronics prior to coupling the ordnance module to the electronics module. In another embodiment, the method includes test firing the firing electronics subsequent to initiating the detonator in a first ordnance module and prior to initiating a second detonator in a second ordnance module.

According to another aspect, the invention relates to an ordnance module that includes a blast-resistant housing. The ordnance module housing is sufficiently blast-resistant that detonation of the detonator does not render an electronics module connected thereto inoperable or unable to connect to a second ordnance module. The ordnance module housing encloses a detonator. The detonator, in one embodiment, is an explosive foil initiator, also known as a slapper detonator. The ordnance module also includes a connector for mechanically and electrically connecting the ordnance module to an electronics module configured to trigger initiation of the detonator. The connector, in one embodiment, is a standard multi-pin connector. A plurality of the pins of the multi-pin connector carry current in parallel to the detonator to trigger its initiation. According to one embodiment, the ordnance module includes a port for holding a detonating cord. The ordnance module housing is configured to direct the explosive force of the detonator to trigger explosion of the detonating cord to trigger at least one detonation remote from the ordnance module.

BRIEF DESCRIPTION OF THE DRAWINGS

The methods and systems may be better understood from the following illustrative description with reference to the following drawings in which:

FIG. 2A is an isometric view of the electronics module of the firing system of FIGS. 1A and 1B.

FIG. 2B is a rear view of the electronics module of the firing system of FIGS. 1A and 1B.

FIG. 3 is a functional block diagram of the electronics module of the firing system of FIGS. 1A and 1B.

FIG. 7 is a flow chart of a third method of using a firing system, such as the firing system of FIGS. 1A and 1B.

DETAILED DESCRIPTION OF THE INVENTION

To provide an overall understanding of the invention, certain illustrative embodiments will now be described, including systems for triggering initiation of explosives and methods of use thereof. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1A:
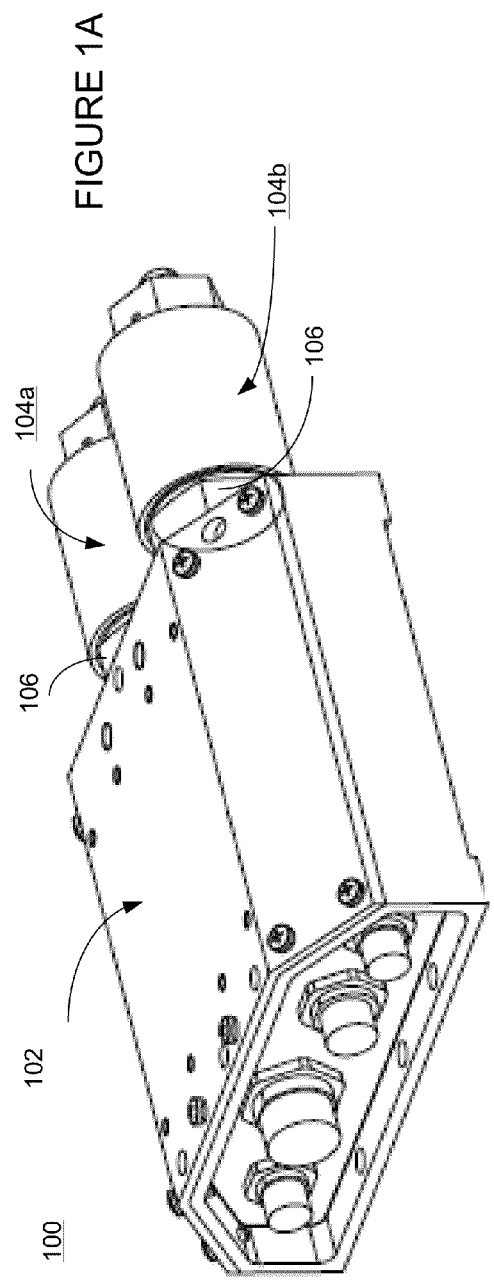
FIGS. 1A and 1B are isometric views of a firing system according to an illustrative embodiment of the invention.
Figure 1B:
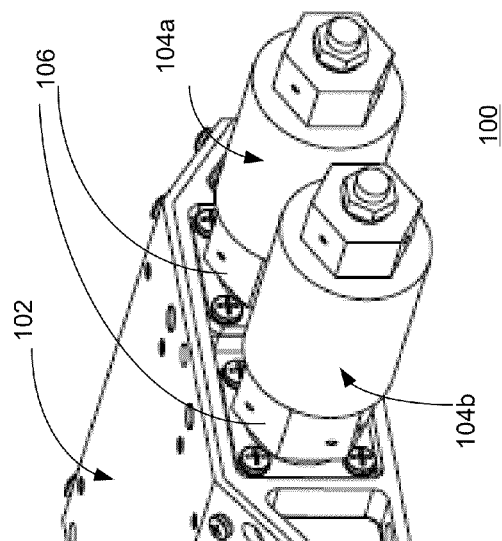

FIGS. 1A and 1B are isometric views of a firing system 100 according to one embodiment of the invention. The firing system 100 includes an electronics module 102 and at least one ordnance module 104. The firing system 100, for example, includes two ordnance modules 104. Alternative embodiments can include only a single ordnance module 104, or three or more ordnance modules 104. The ordnance modules 104 may be triggered substantially simultaneously, or separated in time. In embodiments with three or more ordnance modules 104, two or more ordnance modules 104 may be triggered substantially simultaneously while at least one additional ordnance module 104 may be triggered before or after such triggering event.

The electronics module 102 and the ordnance modules 104 are enclosed in separate housings. They are electrically and mechanically coupled by complimentary connectors 106 extending from their respective housings. The complimentary connectors 106 are preferably multi-pin connectors compliant with US military standards MS3106-16 or SAE-AS31061. The opposing connectors 106 are preferably threaded for easy, secure connection, without requiring specialized tools. The opposing connectors 106 are described further in relation to FIGS. 2A, 4A, and 4B.

The housings of the ordnance modules 104 are designed to be sufficiently blast-resistant that detonation of a detonator within an ordnance module 104 does not substantially damage the electronics module housing, the electronics enclosed therein, or the portion of the connector 106 extending away from the electronics module 102 that mates with a connector portion extending from the ordnance module 104. In certain embodiments, the electronics module 102 may also have a blast-resistant construction to help prevent damage resulting from the detonation of the ordnance module 104 detonator. The electronics module 102, the ordnance module 104, and methods of using the firing system are described further in relation to FIGS. 2-7.

FIG. 2A is an isometric view of the electronics module 102 of the firing system 100 of FIGS. 1A and 1B, according to an illustrative embodiment of the invention. As depicted in FIG. 2A, the electronics module includes a housing 202 and two male MIL-STD connectors 204a and 204b (each referred to generally as a "male connector 204") extending away from the housing 202. In one embodiment, the housing 202 is constructed from aluminum. While, as described below, the ordnance modules 104 are constructed to be sufficiently blast-resistant to reduce the explosive force directed towards the electronics module 102 resulting from triggering a detonator enclosed therein, the provision of a blast-resistant electronics module housing 202 further ensures the survival of the electronics enclosed within the housing 202.

Each male connector 204 includes multiple pins to carry a triggering current to and from the ordnance module 104. That is, each male connector 204 includes multiple pins for carrying a triggering current to an ordnance module 104 and multiple pins for receiving the triggering current back from the ordnance module 104. The use of multiple pins provides a reduced-impedance connection to ensure sufficient current to initiate the ordnance module detonator. The exterior of each male connector 204 is threaded for easy and secure mechanical connection of the male connectors 204 to a corresponding female connector 404 extending from ordnance module 104 (depicted in FIGS. 4A and 4B). Note that in alternative embodiments, the connectors extending away from the electronics module 102 are female connectors and the connectors extending from the ordnance modules 104 are male connectors.

In an alternative implementation, the electronics module 102 includes an external user interface via which a user can initiate diagnostic testing of the electronics module as well as receive the results of such a test. For example, the electronics module 102 may include an external test button for initiating a test sequence. The output may be provided by any suitable means known in the art. For example, the results of the test may be output by initiating illumination of one or more light emitting diodes (LEDs). For example a green LED may be illuminated if the test was successful, whereas a red LED may be illuminated if the test fails. Alternatively, the electronic device may indicate the results of the test audibly, via outputting of one or more beeps, tones, or other sounds associated with the various possible test results.

FIG. 2B is a rear view of the electronics module 102. The electronics module 102 includes four rear ports 206, 208, 210, and 212 for exchanging data with a control device as well as receiving power to trigger initiation of ordnance modules. Rear port 206, referred to as the Fire A Input Port 206, receives a signal governing the triggering of an ordnance module 104a coupled to connector 204a. Rear port 208, referred to as the Fire B Input Port 208, receives a signal governing the triggering of an ordnance module 104b coupled to connector 204b. In alternative embodiments, the electronics module 102 includes a single trigger data port which receives a signal encoding instructions, to trigger the ordnance modules 104 attached to male connectors 204a and 204b. The signal may be coded to instruct the electronics module 102 to trigger both ordnance modules 104 simultaneously, to trigger a single one of the ordnance modules 104, or to trigger the ordnance modules according to a timed sequence. Rear port 210, referred to as the Power, Command, and Monitor Port 210 is configured to receive power, to receive data signals instructing the electronics module to arm one or both ordnance modules or to enter a safe mode with respect to either or both ordnance modules, and to pass status data back from the electronics module 102 to the control device. Status data, in one implementation includes the voltages stored on firing capacitors, data indicating whether either ordnance module is armed, and data reporting back whether received commands have been executed. In one implementation, the Power, Command, and Monitor Port 210 also receives signals for causing the electronics module 102 to conduct one or more diagnostic testing procedures. Rear port 212, referred to as the ARM port 212, is configured to receive both an ARM plug and a SAFE plug. When the SAFE plug is inserted into the ARM port 212, current does not flow into the electronics module 102. Placing the ARM plug into the ARM port 212 completes the power delivery circuit, enabling current to flow into the electronics module 102. In practice, the SAFE Plug is inserted into the ARM port 212 while connecting ordnance modules 104 to the electronics module 102 to avoid inadvertent initiations. The ARM plug is then inserted to enable arming of the ordnance modules 104.

FIG. 3 is a functional block diagram of an illustrative set of electronics components 300, suitable for use in electronics module 102, according to one embodiment of the invention. The electronics components 300 are for the most part standard firing system electronics known to one of ordinary skill in the art. However, in contrast to conventional firing systems, the electronics components 300 are enclosed in their own, scaled housing, apart from the detonator the electronics are designed to trigger. The electronics module 102 is also intended for use with blast-resistant ordnance modules 104, described above, allowing the electronics module 102 to survive detonation of an ordnance module 104. To take advantage of this feature, the electronics components 300 include certain duplicate components to enable sequential detonation of multiple ordnance modules 104.

More specifically, the electronics components 300 include an Arm/Safe Latch Circuit 302, a Power Transfer Switch 304, and a Command Monitor 306. In addition, the electronics components 300 includes separate triggering components for each of the ordnance modules 104 to which it can be concurrently connected. For each ordnance module 104, the electronics components 300 include a Fire Control Circuit 308, a Capacitor Circuit 310, a Voltage Monitor 312, and an Ordnance Module Interface 314. As electronics module 102 is configured for concurrent coupling to two ordnance modules 104, electronics components 300 includes Fire Control Circuits 308a and 308b, Capacitor Circuits 310a and 310b, Voltage Monitors 312a and 312b, and Ordnance Modules Interfaces 314a and 314b.

In general, a detonation has two phases: an arm phase and a trigger phase. The arm phase is initiated upon the Arm/Safe Latch Circuit 302 receiving a signal from a control device via the Power, Command, and Monitor Port 210 to arm one or both of the ordnance modules 104a and 104b. Upon receipt of the arm signal, the Power Transfer Switch 304 transfers power to high a voltage firing capacitor in the corresponding Capacitor Circuit(s) 310a or 310b. The capacitor is charged to a range of 700V to 1500V DC. Each Capacitor Circuit 310a and 310b includes amplifiers to increase the voltage received via the Power, Command, and Monitor Port 210 to the necessary voltage needed to charge the capacitors. The corresponding Voltage Monitor(s) 312a and 312b monitor the voltages on the capacitors and output the voltage back to the control device via the Power, Command, and Monitor Port 210. In the safe mode, the Arm/Safe Latch Circuit 302 prevents charging of capacitors in the Capacitor Circuits 310a and 310b.

Upon the capacitors reaching their desired voltage level according to the Voltage Monitors 312a and 312b, the control device may issue a fire command via the Fire A Input Port 206 and/or the Fire B Input Port 208 to start the trigger phase. Upon receiving such a signal, Fire Control Circuit A 308a and/or Fire Control Circuit B 308b cause their corresponding Capacitor Circuit 310a or 310b to rapidly discharge the energy stored therein via its corresponding Ordnance Module Interface 314a or 314b through the detonator(s) enclosed therein, thereby initiating the detonator(s). The Command Monitor 306 provides feedback to the control device on the whether the commands provided by the control device have been properly executed by the electronics module 102.

Figure 4A:
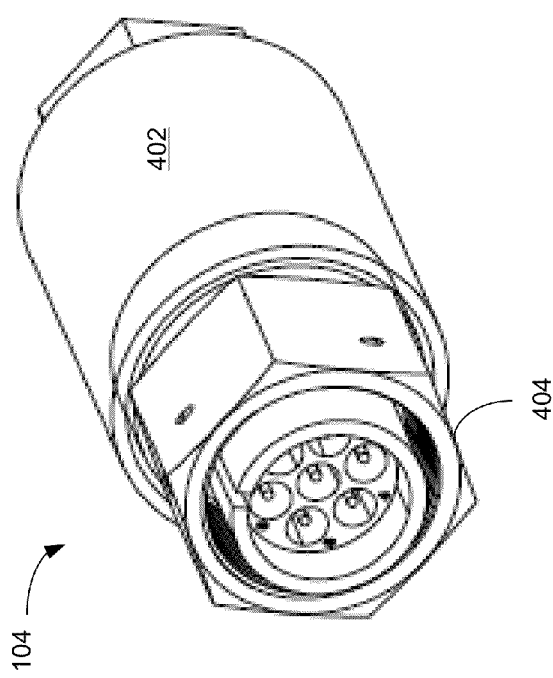
FIG. 4A is an isometric view of the ordnance module of the firing system of FIGS. 1A and 1B.
Figure 4B:
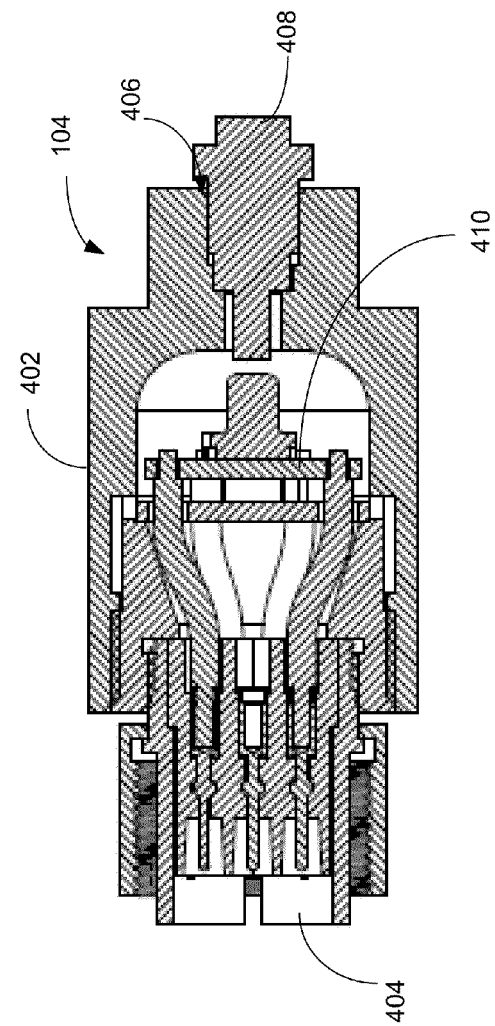
FIG. 4B is a cross-sectional view of the ordnance module of the firing system of FIGS. 1A and 1B.

FIG. 4A is an isometric view of the ordnance module 104 of FIGS. 1A and 1B according to an illustrative embodiment of the invention. FIG. 4B is a cross sectional view of the ordnance module 104 along its axis. Referring to FIGS. 4A and 4B, the ordnance module 104 includes a blast-resistant housing 402 with a female connector 404 at the proximal end and a detonating cord port 406 at its distal end (more clearly seen in FIG. 4B) for holding a detonating cord 408. A detonator 410 is located within the housing 402.

The housing 402 is constructed of aluminum sufficiently thick to prevent the explosive force generated by detonation of the detonator 410 from substantially damaging an electronics module 102 to which the ordnance module 104 attaches. That is, the housing 402 is constructed to be sufficiently rugged that detonation does not damage the male connector of the electronics module 102 to a degree that it cannot mate with the female connector of another ordnance module 104 or damage the electronics (e.g., electronics components 300) enclosed within the electronics module 102 to render them incapable of triggering such other ordnance module. In addition, in certain embodiments, the interior of the housing 402 is shaped to direct the explosive force of the detonator 410 away from its proximal end and towards its distal end and the detonating cord 408. This further reduces the force impacting an electronics module 102. In alternative implementations, other metals besides aluminum, or alloys of multiple metals may be employed without departing from the scope of the invention.

The interior of the housing 402 is coated with electrical insulation to prevent arcing, particularly at high altitudes. In one implementation, potting is used for insulation. In alternative embodiments, the insulation is provided by applying a conformal coating of Parylene and/or polyurethane or other suitable coating.

The female connector 404 is selected to mate with the male connector 204 of an electronics module 102. As indicated above, in alternative implementations, the male and female connectors may be reversed such that the female connector extends from the electronics module 102 and the male connector extends from the ordnance module 104. Referring back to the female connector 404, the connector 404 includes receptacles for each of the pins of the male connector 404. Multiple receptacles receive current from the electronics module 102 in parallel and multiple receptacles transmit current flow back to the electronics module 102 in parallel to achieve a low impedance connection. The wiring connecting the receptacles of the connector 404 to the detonator 410 are preferably made from a multiplicity of short strands of heavy gage wire connected in parallel. The female connector 404 also includes a threaded rotatable hex coupling nut 412. The ordnance module can then be easily and securely coupled to the electronics module by inserting the male connector 204 into the female connector 404, followed by the user tightening the rotatable hex coupling nut 412 to secure the connection. While no tools are necessary for such a connection, a user may employ a hex coupling wrench to tighten the connection.

The detonating cord port 406 holds a detonating cord 408. Preferably the detonating cord 408 is a flexible confined detonating cord, also known as an FCDC. The detonator 410, is preferably an exploding foil initiator (or EFI), also referred to as a slapper detonator, though other electrically triggered detonators known in the art may be employed without departing from the scope of the invention. The explosive force of the detonator 410 may vary and is selected for the specific application as needed. Ordnance modules 104 with higher power detonators are constructed with thicker housings to increase their blast-resistance accordingly. The exact appropriate thickness will vary based on explosive power, shape of the housing, and other ordnance module parameters, and can be determined by one of ordinary skill in the art without undue experimentation.

Figure 5:
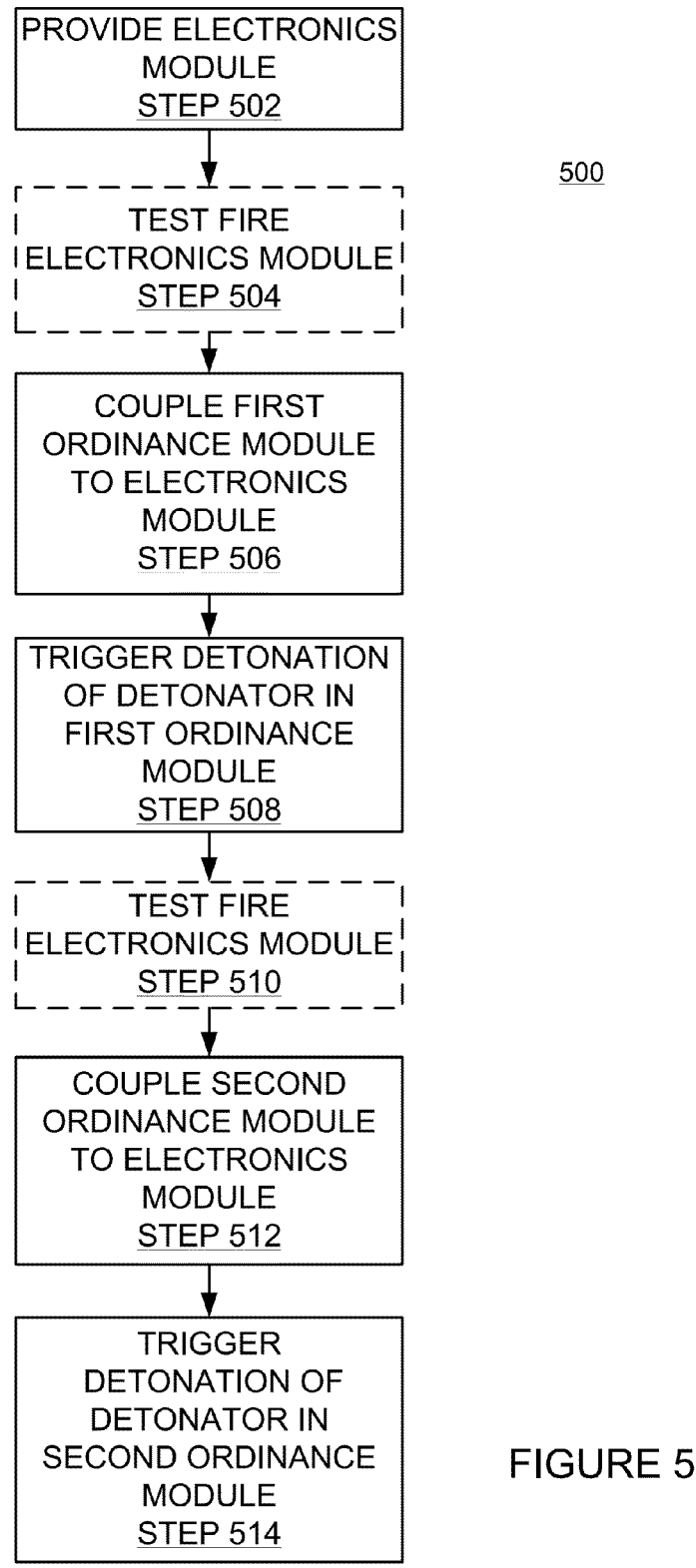
FIG. 5 is a flow chart of a method of using a firing system, similar to that depicted in FIGS. 1A and 1B, though only having a single connector for connecting to one ordnance module at a time.
Figure 6:
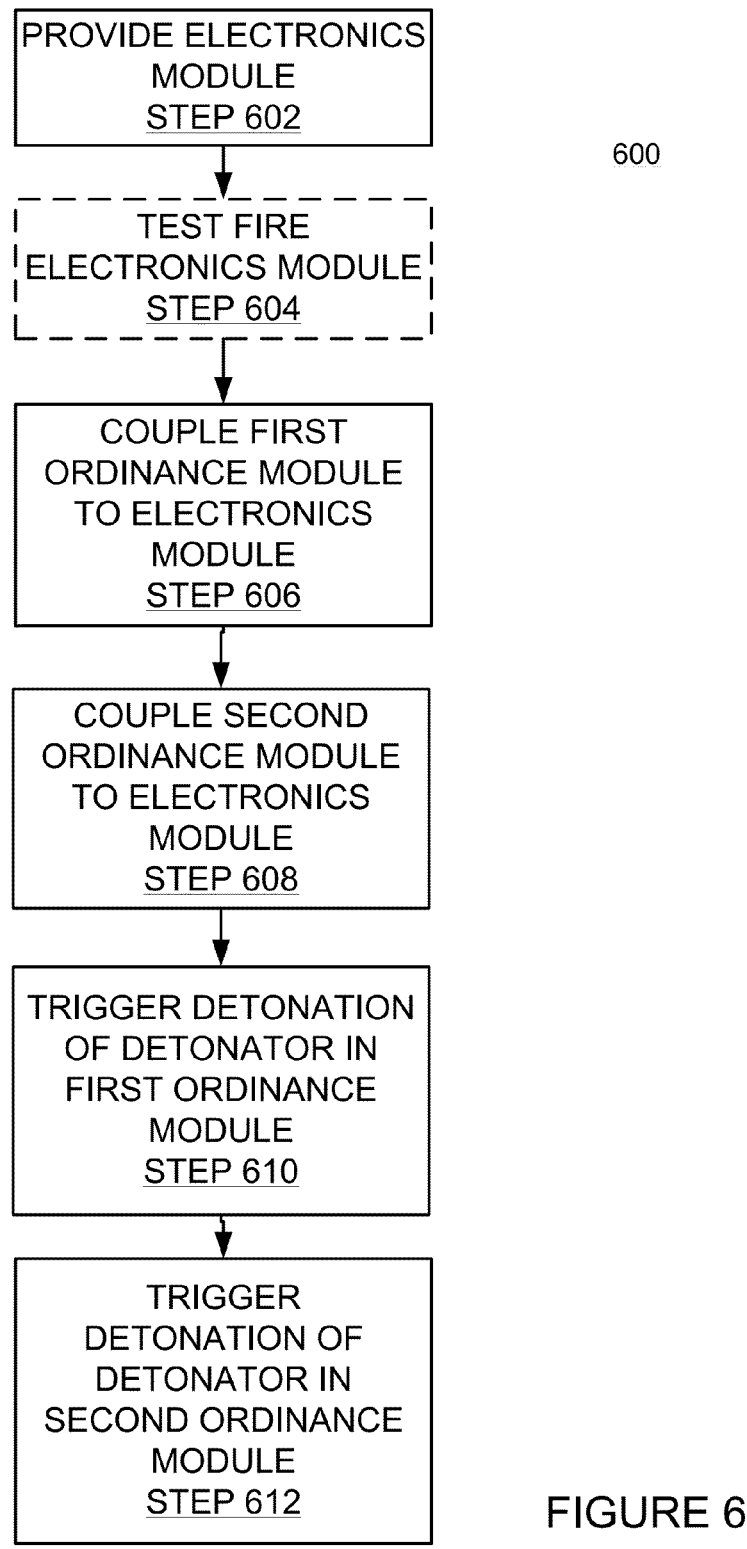
FIG. 6 is a flow chart of a second method of using a firing system, such as the firing system of FIGS. 1A and 1B.

Firing systems, such as those described in the FIGS. 1A-4B can be used for a variety of applications. They can be used in mining, excavation, demolition, munitions, or in other applications. For example, such firing systems may be used in triggering explosives that separate various stages of launch vehicles, such as rockets, during take-off. They may also be used to deploy payloads carried by such launch vehicles. Such firing systems are particularly useful in applications in which the electronics modules incorporated therein can be recovered post ordnance detonation, allowing them to be re-used. They are also useful in applications in which it is desirable to initiate multiple detonations in a serial fashion from a single electronics module. FIGS. 5-7, described, below, depict various methods of using the firing systems according to illustrative embodiments of the invention.

FIG. 5 is a flow chart of a method 500 of using a firing system, similar to that depicted in FIGS. 1A and 1B, though only having a single connector. Thus, the electronics module can only be connected to one ordnance module at a time. From a connectivity standpoint, single ordnance electronics module includes only a single fire control port, such as Fire A Input port 206. The method 500 begins with providing the electronics module (step 502) and connecting it to a control device with the appropriate cables.

Before proceeding, the control device may optionally initiate a diagnostic test of the electronics module (step 504). To conduct a diagnostic test, a dummy ordnance module is connected to the electronics module. The dummy ordnance module includes a simulated load selected to match that of a detonator. It also includes an output back to control device. The control device analyzes the output of the dummy ordnance to determine if the electronics module is functional. If the electronics module fails the test, it is either replaced or repaired before proceeding.

A first ordnance module, such as ordnance module 104, is then connected to the electronics module (step 506). Upon instruction from the control device, the electronics module triggers initiation of the detonator enclosed in the ordnance module 104 (step 508).

Before reusing the electronics module, optionally, a user may retest the electronics module (step 510) to confirm that detonation of the first ordnance module did not damage the electronics module. If the electronics module fails the test, it is either replaced or repaired before proceeding. A second ordnance module is then coupled to the electronics module (step 512), which subsequently triggers its detonation (step 514).

FIG. 6 is a flow chart of a second method 600 of using a firing system, such as the firing system 100 of FIGS. 1A and 1B. Method 600 provides for sequential initiation of two ordnance modules 104 that are connected at the same to the electronics module 102. The method begins with providing the electronics module 102 (step 602) and connecting it to a control device. Before proceeding, the control device may optionally initiate a diagnostic test of the electronics module 102 (step 604). If the electronics module fails the test, it is either replaced or repaired before proceeding.

First and second ordnance modules 104 are then connected to the electronics module 102 (steps 606 and 608). Upon instruction from the control device, the electronics module 102 triggers initiation of the detonator in only the first ordnance module 104 (step 610). As the firing system is designed such that the detonation of the detonator does not render the electronics module 102 inoperable, the control device then instructs the electronics module to trigger initiation of the detonator in the second ordnance module 104 (step 612). Optionally, the electronics module 102 may be tested again between initiation of the detonator in the first ordnance module and the detonator in the second ordnance module.

FIG. 7 is a flow chart of a third method 700 of using a firing system, such as the firing system of FIGS. 1A and 1B. Method 700 provides for simultaneous initiation of two ordnance modules 104 connected to an electronics module 102. Steps 702-708 of method 700 are identical to method steps 600-608 of method 600. In contrast to method 600, in method 700, the electronics module simultaneously initiates the detonators in both ordnance modules (step 710).

The invention may be embodied in other specific forms without departing from the spirit or essential characteristics thereof. The foregoing embodiments are therefore to be considered in all respects illustrative, rather than limiting of the invention.

What is claimed is:

1. An ordnance firing system comprising:
    an electronics module including:
        a first housing enclosing firing electronics for electrically triggering initiation of a detonator;
        an electronics module connector extending away from the first housing for detachably mechanically and electrically connecting the electronics module to an ordnance module;
    an ordnance module including:
        a second housing enclosing a detonator, wherein the second housing is blast-resistant; and
        an ordnance module connector extending from the proximal end of the second housing for mating with the electronics module connector;
        wherein the second housing is sufficiently blast-resistant to prevent detonation of the detonator from damaging the electronics module to a degree that would prevent the electronics module from connecting to a second ordnance module and initiating a detonator enclosed in such second ordinance module.

2. The ordnance firing system of claim 1, wherein the electronics module connector comprises a multi-pin connector.

3. The ordnance firing system of claim 2, wherein the firing electronics are configured to output current via a plurality of pins of the multi-pin electronics module connector in parallel.

4. The ordnance firing system of claim 1, wherein the electronics module connector is a low-impedance connector.

5. The ordnance firing system of claim 1, wherein the detonator comprises an explosive foil initiator.

6. The ordnance firing system of claim 1, wherein the electronics module connector and the ordnance module connector are threaded.

7. The ordnance firing system of claim of claim 1, comprising a second electronics module connector extending from the electronics module for mating to a second ordnance module, such that the electronics module can be coupled to two ordnance modules concurrently.

8. The ordnance firing system of claim of claim 7, wherein the firing electronics are configured to trigger at least two detonators substantially simultaneously.

9. The ordnance firing system of claim 7, wherein the firing electronics are configured to trigger at least two detonators at two or more separate times.

10. The ordnance firing system of claim 1, wherein the firing system is configured to trigger separation of components of a spacecraft.

11. An ordnance module configured for coupling to a separately housed electronics module that includes electronics for triggering initiation of a detonator enclosed in the ordnance module, the ordnance module comprising:
   the detonator;
   a blast-resistant housing; and
   a connector for mechanically and electrically connecting the ordnance module to the electronics module;
   wherein the blast-resistant housing is sufficiently blast-resistant to prevent detonation of the detonator from damaging the electronics module to a degree that would prevent the electronics module from connecting to a second ordnance module and initiating a detonator enclosed in such second ordnance module.

12. The ordnance module of claim 11, wherein the detonator comprises an explosive foil initiator.

13. The ordnance module of claim 12, wherein the ordnance module is configured such that a plurality of the pins of the multi-pin connector carry current to the detonator to trigger its initiation.

14. The ordnance module of claim 11, wherein the connector comprises a multi-pin connector providing a low impedance electrical connection between the electronics module and the ordnance module.

15. The ordnance module of claim 11, comprising a port for holding a detonating cord, wherein the housing is configured to direct the explosive force of the detonator to trigger explosion of the detonating cord to trigger at least one detonation remote from the ordnance module.

\* \* \* \* \*